United States Patent Office 3,642,787
Patented Feb. 15, 1972

3,642,787
QUATERNIZED REACTIVE PHTHALOCYANINE DYESTUFFS CONTAINING TRIAZINE AND NICOTINIC ACID GROUPS
Sandro Ponzini, Saronno, Paolo Castelli, Monza, and Jean Stanislao Lawendel, Milan, Italy, assignors to Aziende Colori Nazionali Affini ACNA S.p.A., Milan, Italy
No Drawing. Original application June 5, 1968, Ser. No. 749,899. Divided and this application Mar. 19, 1970, Ser. No. 21,221
Int. Cl. C07d 55/22
U.S. Cl. 260—242
5 Claims

ABSTRACT OF THE DISCLOSURE

Reactive triazine dyestuffs having the formula:

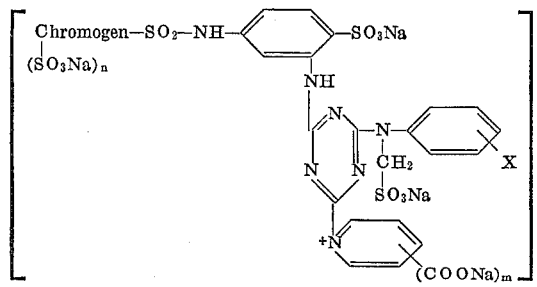

wherein chromogen is a phthalocyanine dyestuff residue, X is selected from the group consisting of H, $CH_3$, $OCH_3$ and $OC_2H_5$, $n$ is an integer from 1 to 4, and $m$ is 1 or 2, are effective for dyeing cellulose fibers. The dyestuffs may be absorbed and fixed onto the cellulose fibers by known hot or cold dyeing techniques. Intense dyeings having very good fastness to washing are obtained.

CROSS REFERENCE TO RELATED APPLICATIONS

This application is a division of copending application Ser. No. 749,899, filed June 5, 1968, now U.S. Pat. 3,522,232, which application is a division of application Ser. No. 472,668, filed July 16, 1965, now U.S. Pat. 3,416,875.

BACKGROUND OF THE INVENTION

(1) Field of the invention

This invention relates to a series of reactive triazine dyestuffs capable of being absorbed and chemically fixed on cellulose fibers by either a cold or warm dyeing process.

(2) Description of the prior art

Various classes of dyestuffs having reactive groups capable of forming such bonds are already known. These include dyestuffs containing at least one of the following reactive groups: monochlorotriazinyl, dichlorotriazinyl, trichloropyrimidyl, vinylsulfonic, and dichloroquinoxalyl. The dyeing conditions for applying these dyestuffs varies according to the nature of the groups present.

SUMMARY OF THE INVENTION

The dyestuffs of the present invention are prepared by quaternizing a reactive triazine dyestuff having the general formula:

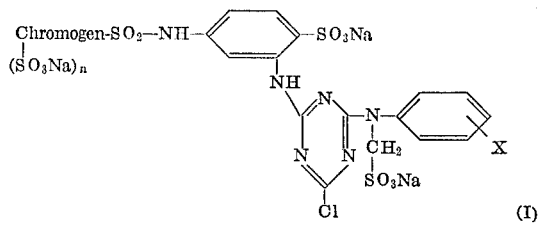

wherein X is selected from the group consisting of H, $CH_3$, $OCH_3$, and $OC_2H_5$; $n$ is an integer from 1 to 4, and the chromogen is the colored residue of a phthalocyanine dyestuff.

The reactive quaternized dyestuffs of the present invention have the general formula:

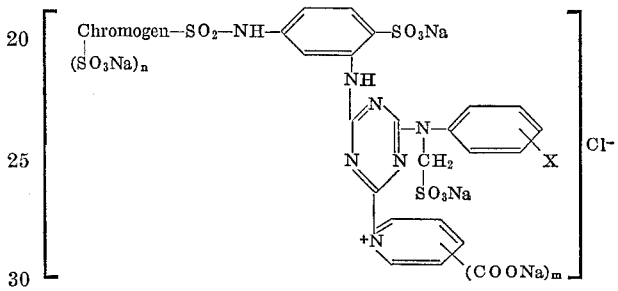

wherein chromogen, $m$, X and $n$ are as defined above. The reactive quaternized dyestuffs of the present invention may be prepared by reacting a metal salt of a nicotinic acid with the reactive dyestuff of the general Formula I.

DESCRIPTION OF THE PREFERRED EMBODIMENT

More particularly, the dyestuffs of the present invention have the formula:

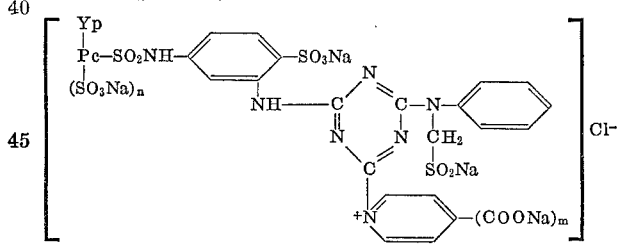

wherein Pc is copper phthalocyanine, Y is $-SO_2NH_2$, $p$ is 0 or 0.5, and $n$ is an integer from 1 to 4.

The reactive dyestuffs of the present invention have improved characteristics for applications in dyeing with remarkably increased dyeing yields and possess the further advantage that they may be used by both cold and warm dyeing applications. It is quite unexpected that by quaternizing the dyestuffs of the general Formula I with a metal salt of isonicotinic acid, dyeing yields higher than those obtained by the use of a dyeing catalyst based on other organic tertiary amines can be obtained using the cold application method. This is particularly surprising with respect to the aliphatic tertiary amines, such as asymmetric dimethylhydrazine, since it is known that the hydrosolubilizing substituents ($SO_3H$, COOH) diminish the affinity of dyestuffs for cellulose fibers.

Also, using the dyestuffs of the present invention in a warm dyeing application, i.e., 60–90° C., the dyeing yields on cellulose are substantialy improved over those obtained with the prior art dyestuffs.

The use of isonicotinic acid as the quaternizing agent of the above mentioned chlorotriazine dyestuffs generally produces the following advantages with respect to the use of other quaternizable tertiary amines, namely:

(1) Dyeing of cellulose fibers by the cold process without adding dyeing catalysts.

(2) Increasing remarkably, in most cases, the dyeing yields, particularly in the cold dyeing process, even when compared to the use of known dyeing catalysts based on aliphatic tertiary amines.

(3) In contrast to the other tertiary amines, isonicotinic acid is odorless, and therefore the dye baths, both cold and warm, are completely free of disagreeable or irritating odors.

(4) Increasing of the dye solubility in the cases where it is particularly poor.

(5) Possibility of dyeing cellulose materials in a warm dye bath by generally used processes, using the same quaternized dyes in those particular cases where practical considerations might suggest this method as the preferable one.

The use of isonicotinic acid, also from the point of view of costs, is advantageous because the excess isonicotinic acid used in the quaternization reaction may be easily recovered from the mother liquors by filtration, after acidification of these mother liquors, and then it may be reused.

The quaternization reaction is generally carried out by dissolving the reactive phthalocyanine dyestuff in a 2% solution of a metal salt of the isonicotinic acid.

The reaction temperature may be varied within wide limits but it is preferably kept between 60 and 80° C. The reaction rate is obviously influenced by the selected temperature and may be monitored by chromatographic analysis.

The following examples serve to further illustrate the present invention without in any way limiting the scope thereof:

EXAMPLE 1

2 parts of isonicotinic acid and 0.64 part of 100% NaOH are dissolved in 100 parts of water at 80° C. 4 parts of the dyestuff:

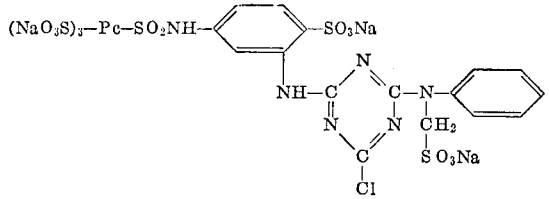

wherein Pc means copper phthalocyanine, are added to the solution.

The solution is maintained at this temperature for one night (about 15 hours), and then the dyestuff is separated by direct drying at about 60° C.

A dyestuff having the following formula is obtained:

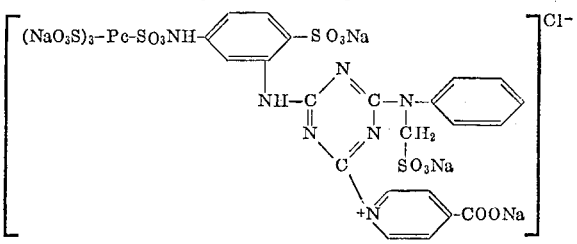

wherein Pc means copper phthalocyanine.

The obtained dyestuff dyes cotton at a temperature of 60° C., with good tinctorial yields, in a turquoise shade having good fastness to washing. The dyestuff to be quaternized used in this process can be obtained as follows:

0.1 mol of the intermediate having the following structure:

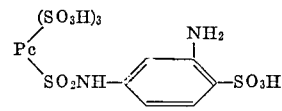

wherein Pc means copper phthalicyanine, are added under agitation, in the form of a paste, in 2000 parts of water and the pH is adjusted to a value of 8 by adding small amounts of NaOH.

The solution thus obtained is slowly added at 0–5° C. to a solution (which is also kept at 0–5° C.) of the condensation product of 0.1 mol of cyanuric chloride and 0.1 mol of the sodium salt of the anilino methanesulfonic acid added with 10 parts of sodium bicarbonate.

(The condensation product of cyanuric chloride and the sodium salt of the anilino methanesulfonic acid can be prepared, for instance, by dissolving, in 500 parts of water, 0.1 mol of the sodium salt of the anilino methanesulfonic acid and adding 17 parts of sodium bicarbonate and successively, at a temperature of 0–5° C., a suspension (kept at 0–5° C.) of 0.1 mol of cyanuric chloride in 1500 parts of water).

The whole is agitated for some hours at increasing temperature up to 20–25° C., until a sample shows that the reaction is complete.

The reaction product is separated by salting.

EXAMPLE 2

By working as described in the preceding example, but using the dyestuff having the structure:

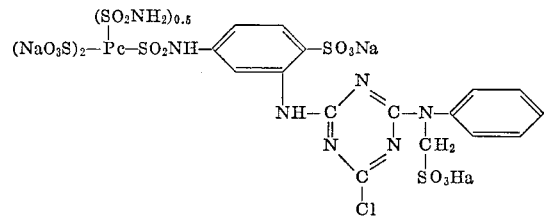

wherein Pc means copper phthalocyanine, a quaternized dyestuff is obtained having characteristics similar to those of the dyestuff of Example 1. The dyestuff has the following formula:

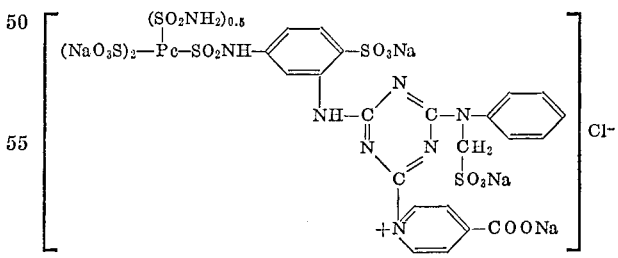

wherein Pc means copper phthalocyanine.

EXAMPLE 3

A dye bath is prepared by dissolving 2 parts by weight of the dyestuff prepared according to the Example 2, in 2000 parts by volume of water at the temperature of 60° C.

100 parts of the cellulose material are introduced in the dye bath; after 15 minutes, 60 parts of anhydrous $Na_2SO_4$ are added; after 45 minutes, 15 parts of $Na_2CO_3$ are added; after 60 minutes, 15 parts of $Na_2CO_3$ are added.

The bath is maintained at 60° C. for one further hour, in order to complete the fixing of the dyestuff and then the material is soaped for 30 minutes at the boiling point with a 3% soap solution.

A cellulose material dyed in a turquoise shade having very good fastness to wet treatment is obtained with very good tinctorial yields.

Variations and modifications can, of course, be made without departing from the spirit and scope of the invention.

Having thus described the invention, what is desired to be secured by Letters Patent and is hereby claimed is:

1. A reactive dyestuff having the formula:

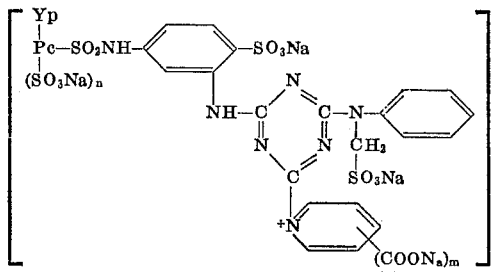

wherein Pc is a phthalocyanine residue, Y is $SO_2NH_2$, $p$ is 0 or 0.5, $n$ is an integer from 1 to 4 and $m$ is 1 or 2.

2. The reactive dyestuff as claimed in claim 1 and having the structure:

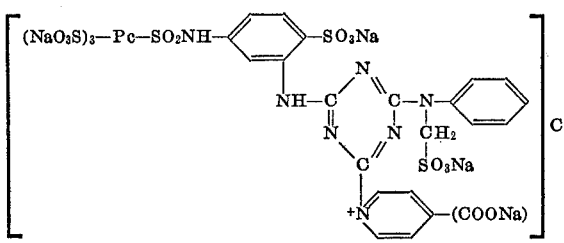

3. The reactive dyestuff as claimed in claim 1, and having the structure:

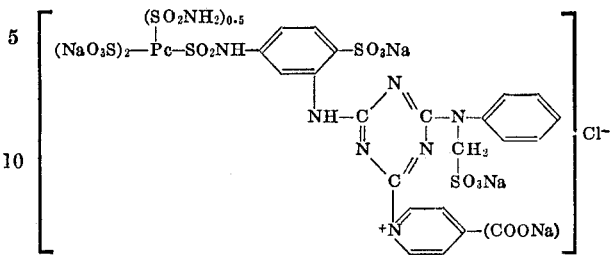

4. The reactive dyestuff as claimed in claim 2 wherein Pc is copper phthalocyanine.

5. The reactive dyestuff as claimed in claim 3 wherein Pc is copper phthalocyanine.

References Cited

UNITED STATES PATENTS

| 3,126,377 | 3/1964 | Tartter et al. | 260—242 |
| 3,206,451 | 9/1965 | Benz et al. | 260—153 |

OTHER REFERENCES

Dictionary of Organic Compounds, 4th ed., vol. 5, p. 2743 (1965).

HENRY R. JILES, Primary Examiner

S. D. WINTERS, Assistant Examiner

U.S. Cl. X.R.

260—249.6, 249.5, 34.5; 8—54.2

UNITED STATES PATENT OFFICE
CERTIFICATE OF CORRECTION

Patent No. 3,642,787      Dated February 15, 1972

Inventor(s) Sandro Ponzini, Paolo Castelli & Jean Stanislao Lawendel

It is certified that error appears in the above-identified patent and that said Letters Patent are hereby corrected as shown below:

Column 1, line 32: "chromogen" should read -- Chromogen --;
Column 2, line 15: "chromogen" should read -- Chromogen --;
Column 2, line 31: "chromogen" should read -- Chromogen --;
Column 2, third structural formula, line 46, that portion of the formula reading " 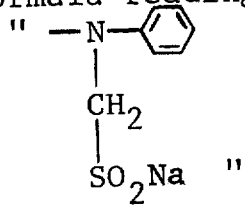     should read     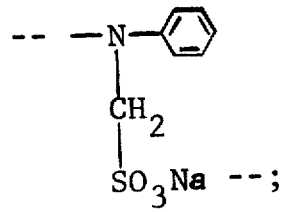 ;

Column 3, line 3: "substantialy" should read -- substantially --;
Column 3, line 27: "of costs," should read -- of cost, --;
Column 3, second structural formula, line 63, that portion of the formula reading " 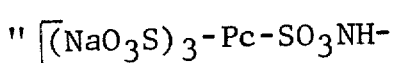     should read     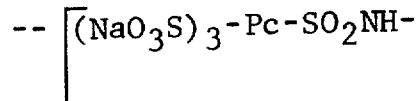

"

Column 4, line 11: "phthalicyanine" should read -- phthalocyanine --; Column 4, second structural formula, line 43, that portion of the formula reading " 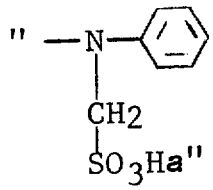     should read     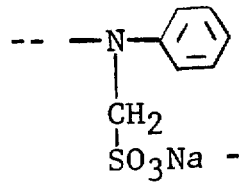 --.

PO-1050
(5/69)

UNITED STATES PATENT OFFICE
CERTIFICATE OF CORRECTION

Patent No. 3,642,787      Dated February 15, 1972

Inventor(s) Sandro Ponzini, Paolo Castelli & Jean Stanislao Lawendel

It is certified that error appears in the above-identified patent and that said Letters Patent are hereby corrected as shown below:

PAGE - 2

Column 4, line 70: After "are added;" (first occurrence), insert -- after 30 minutes, 60 parts of anhydrous $Na_2SO_4$ are added; --; Column 5, the structural formula in Claim 1, line 15, that portion of the formula reading

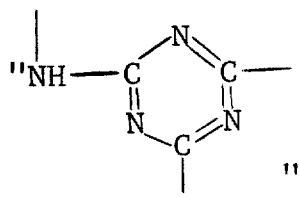  should read  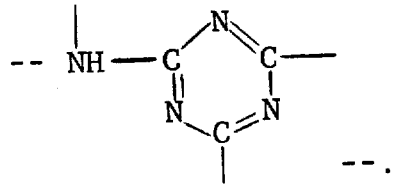

Column 5, Claim 2, line 24: "th e" should read -- the --.

Signed and sealed this 27th day of June 1972.

(SEAL)
Attest:

EDWARD M. FLETCHER, JR.
Attesting Officer

ROBERT GOTTSCHALK
Commissioner of Patents